(12) United States Patent
Kida et al.

(10) Patent No.: US 11,492,418 B2
(45) Date of Patent: Nov. 8, 2022

(54) CYCLIC OLIGOSACCHARIDE AND METHOD FOR PRODUCING SAME

(71) Applicants: OSAKA UNIVERSITY, Suita (JP); DKS CO. LTD., Kyoto (JP)

(72) Inventors: Toshiyuki Kida, Suita (JP); Masahito Nishiura, Kyoto (JP)

(73) Assignees: OSAKA UNIVERSITY, Suita (JP); DKS CO. LTD., Kyoto (JP)

( * ) Notice: Subject to any disclaimer, the term of this patent is extended or adjusted under 35 U.S.C. 154(b) by 0 days.

(21) Appl. No.: 17/276,358

(22) PCT Filed: Oct. 8, 2019

(86) PCT No.: PCT/JP2019/039655
§ 371 (c)(1),
(2) Date: Mar. 15, 2021

(87) PCT Pub. No.: WO2020/080194
PCT Pub. Date: Apr. 23, 2020

(65) Prior Publication Data
US 2022/0041758 A1     Feb. 10, 2022

(30) Foreign Application Priority Data
Oct. 15, 2018 (JP) .............................. JP2018-194580

(51) Int. Cl.
*C08B 15/00* (2006.01)
(52) U.S. Cl.
CPC ................................... *C08B 15/00* (2013.01)
(58) Field of Classification Search
CPC ..................................................... C08B 15/00
See application file for complete search history.

(56) References Cited

U.S. PATENT DOCUMENTS 6,153,746 A     11/2000   Shah et al.

FOREIGN PATENT DOCUMENTS

| JP | 4-81403 A | 3/1992 |
|----|-----------|--------|
| JP | 11-60610 A | 3/1999 |
| JP | 2013-28744 A | 2/2013 |
| JP | 2016-69652 A | 5/2016 |

OTHER PUBLICATIONS

Wakao, M. et al. ("Chemical Synthesis of Cyclodextrins by Using Intramolecular Glycosylation", The Journal of Organic Chemistry, 2002, vol. 67, pp. 8182-8190 (Year: 2002).*
Gogolashvili et al., "Separation of enilconazole enantiomers in capillary electrophoresis with cyclodextrin-type chiral selectors and investigation of structure of selector-select and complexes by using nuclear magnetic resonance spectroscopy," Electrophoresis, vol. 38, No. 15, 2017, pp. 1851-1859.
International Preliminary Report on Patentability (PCT/IPEA/409) issued in PCT/JP2019/039655, dated Aug. 31, 2020.
International Search Report (PCT/ISA/210) issued in PCT/JP2019/039655, dated Dec. 17, 2019.
Wakao et al., "Chemical Synthesis of Cyclodextrins by Using intramolecular Glycosylation," The Journal of Organic Chemistry, vol. 67, 2002, pp. 8182-8190.
Written Opinion of the International Searching Authority (PCT/ISA/237) issued in PCT/JP2019/039655, dated Dec. 17, 2019.

* cited by examiner

*Primary Examiner* — Leigh C Maier
*Assistant Examiner* — Everett White
(74) *Attorney, Agent, or Firm* — Birch, Stewart, Kolasch & Birch, LLP

(57) ABSTRACT

Provided is a novel cyclic oligosaccharide derived from cellulose. The cyclic oligosaccharide is a cyclic oligosaccharide of Formula (1) having a β-1,4 glucosidic bond. In the formula, R represents a hydrogen atom or a substituent thereof, a plurality of the Rs may be identical or different, and n represents an integer of 0 to 3.

2 Claims, 11 Drawing Sheets

Methylated cyclic cellooligosaccharide (hexamer)

PA-cyclo-5mer : Fully-acetylated cyclic pentamer
PA-cyclo-6mer : Fully-acetylated cyclic hexamer
PA-cyclo-7mer : Fully-acetylated cyclic heptamer
PA-cyclo-8mer : Fully-acetylated cyclic octamer PA-linear-6mer : Fully-acetylated linear hexamer
PA-linear-7mer : Fully-acetylated linear heptamer
PA-linear-8mer : Fully-acetylated linear octamer Cyclo-6mer : Cyclic hexamer     Linear-6mer : Linear hexamer
Cyclo-7mer : Cyclic heptamer    Linear-7mer : Linear heptamer
Cyclo-8mer : Cyclic octamer     Linear-8mer : Linear octamer

CYCLIC OLIGOSACCHARIDE AND METHOD FOR PRODUCING SAME

TECHNICAL FIELD

The present invention relates to a novel cellulose-derived cyclic oligosaccharide having a β-1,4 glucosidic bond and a method for producing the same.

BACKGROUND ART

Conventionally, cyclodextrins are known as cyclic oligosaccharides. Cyclodextrins have a cyclic structure in which glucoses are linked by α-1,4 glucosidic bonds, as represented by the following general formula (X) (wherein m is an integer of 1 to 3), and generally include α-cyclodextrin in which 6 glucoses are bound, β-cyclodextrin in which 7 glucoses are bound, and γ-cyclodextrin in which 8 glucoses are bound.

[Chemical Formula 1]

Chemical Formula 1

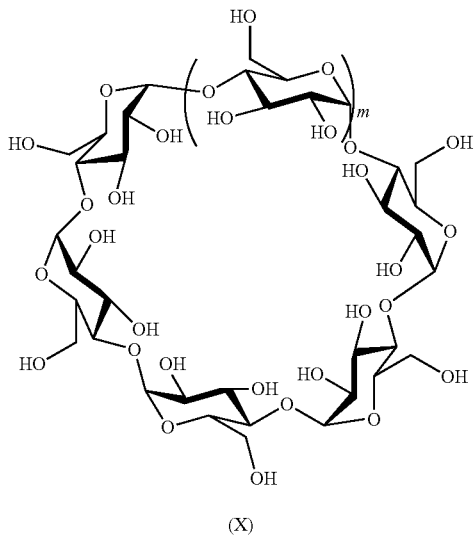

(X)

Such cyclodextrins have pores with a size of about 1 nm inside the cyclic structure, in which relatively small molecules called guest molecules can be taken. Since the hydroxy groups of cyclodextrins are outside the pores, the outside of the cyclic structure is hydrophilic, and the inside of the pores is hydrophobic. Therefore, cyclodextrins have the property of including hydrophobic guest molecules or some of them in the pores, and, through the use of this property, cyclodextrins and their chemically modified products, i.e., cyclodextrin derivatives, are used in foods, cosmetics, toiletry products, pharmaceuticals, and the like for the purpose of non-volatilization and sustained release of volatile substances, stabilization of unstable substances, solubilization of poorly soluble substances, and the like (see, for example, Patent Literatures 1 to 4 below).

CITATION LIST

Patent Literature

[PTL 1]: JP H4-81403 A
[PTL 2]: JP H11-60610 A
[PTL 3]: JP 2013-28744 A
[PTL 4]: JP 2016-69652 A

SUMMARY OF INVENTION

Technical Problem

Cyclodextrins are cyclic maltooligosaccharides derived from starch which is an edible resource, and have a glucose as a constituent unit. Polysaccharides containing a glucose as a constituent unit include cellulose in addition to starch. Cellulose is a compound having a β-1,4 glucosidic bond, is the most abundant organic compound on the earth, and is a recyclable non-edible plant resource. Therefore, if a cellulose-derived cyclic oligosaccharide can be produced, resources can be effectively utilized.

In light of the above, an object of embodiments of the present invention is to provide a novel cyclic oligosaccharide derived from cellulose and a method for producing the same.

Solution to Problem

According to an embodiment of the present invention, a cyclic oligosaccharide represented by the following general formula (1) is provided.

[Chemical Formula 2]

Chemical Formula 2

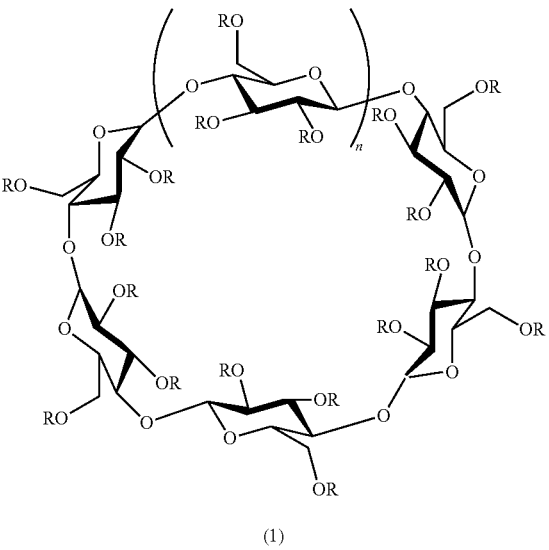

(1)

In the formula, R represents a hydrogen atom or a substituent thereof, a plurality of the Rs may be identical or different, and n represents an integer of 0 to 3.

According to an embodiment of the present invention, a method for producing the cyclic oligosaccharide including binding hydroxy groups at terminals of an oligosaccharide represented by the following general formula (2) for cyclization is also provided.

[Chemical Formula 3]

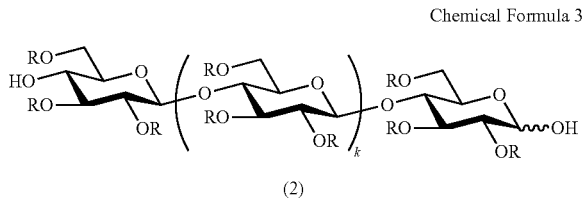

Chemical Formula 3

(2)

In the formula, R represents a hydrogen atom or a substituent thereof, a plurality of the Rs may be identical or different, and k represents an integer of 3 to 6.

Advantageous Effects of Invention

According to the present embodiments, a novel cyclic oligosaccharide derived from cellulose can be provided, and resources can be effectively used.

DESCRIPTION OF EMBODIMENTS

Figure 1:
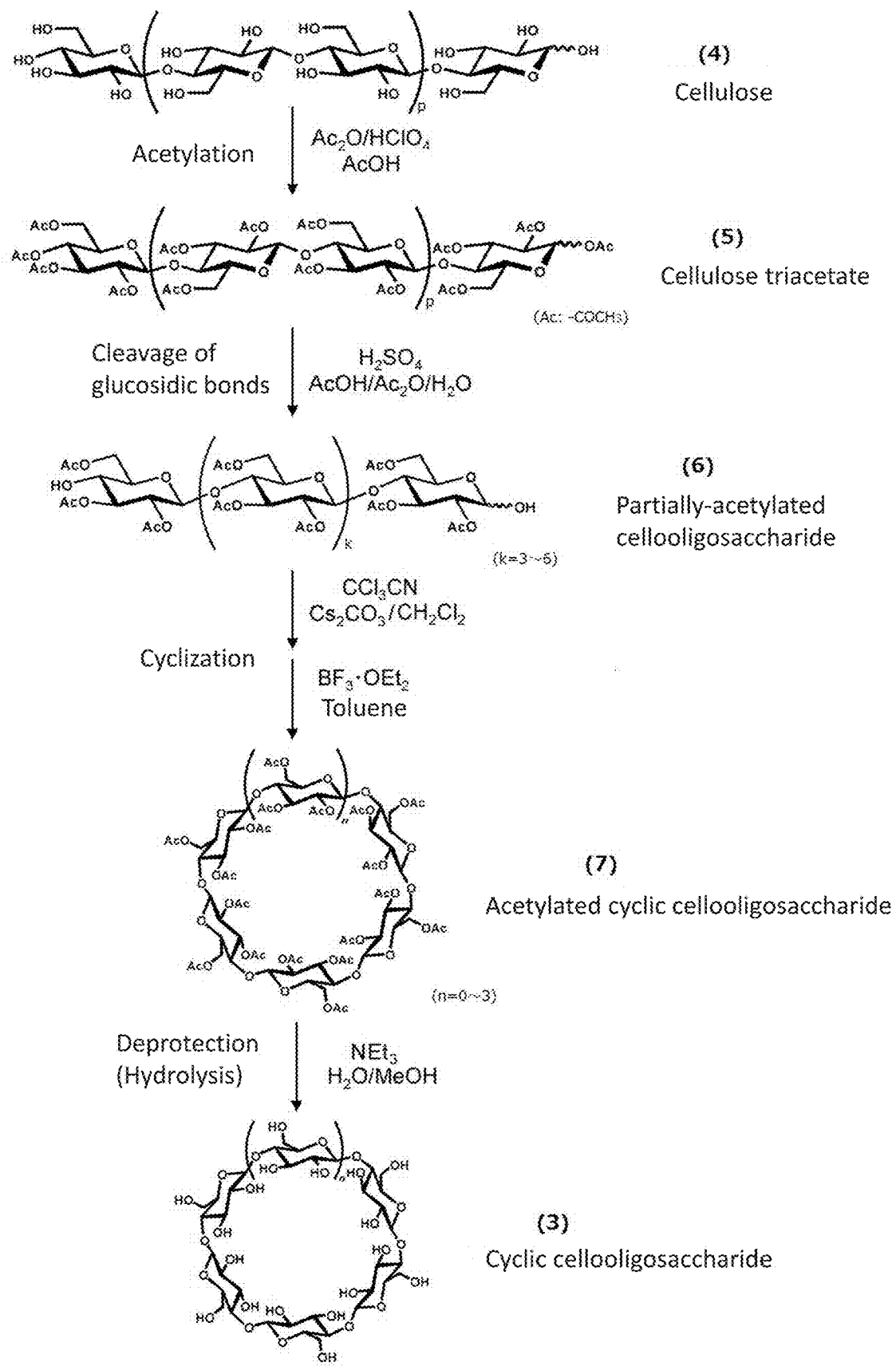
FIG. 1 is a diagram showing a step of synthesizing a cyclic oligosaccharide according to an embodiment.

A cyclic oligosaccharide (also referred to as cyclic cellooligosaccharide) according to the present embodiment is a compound represented by the above general formula (1), and has a cyclic structure in which constituent units, which are glucoses or derivatives thereof, are linked by β-1,4 glucosidic bonds. In Formula (1), n represents an integer of 0 to 3. Therefore, the cyclic oligosaccharide represented by Formula (1) is a pentamer, hexamer, heptamer or octamer of the constituent units, or a mixture of two or more thereof.

In Formula (1), R represents a hydrogen atom or a substituent thereof, and a plurality of the Rs may be identical or different. When all the Rs in Formula (1) are hydrogen atoms, it is a chemically-unmodified (i.e., unsubstituted) cyclic oligosaccharide represented by the following formula (3) (where n in Formula (3) represents an integer from 0 to 3).

[Chemical Formula 4]

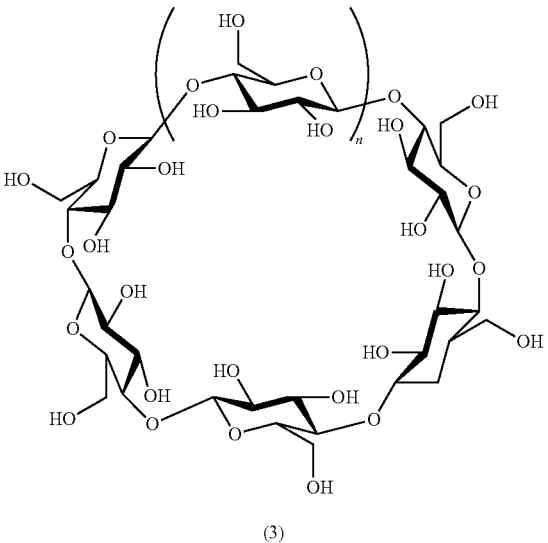

Chemical Formula 4

(3)

The cyclic oligosaccharide of Formula (3) is different from the cyclodextrin of the above formula (X) only in that the linking structure between glucoses is a β-1,4 bond in the former, but is an α-1,4 bond in the latter. So, substituents can be basically introduced by using a known chemical modification method applied to the cyclodextrin. Therefore, the cyclic oligosaccharide of Formula (1) can have substituents similar to those of a known cyclodextrin.

As described above, all of the Rs in Formula (1) may be either hydrogen atoms or substituents, or hydrogen atoms and substituents may coexist. When hydrogen atoms and substituents coexist, the ratio between hydrogen atoms and substituents is not particularly limited. For example, when ORs are divided into groups (OR$^1$) corresponding to the primary hydroxy groups of the glucose constituent unit and groups (OR$^2$) corresponding to the secondary hydroxy groups of the glucose constituent unit, and Formula (1) is rewritten as the following general formula (1-1), all of R$^1$s may be substituents and all of R$^2$s may be hydrogen atoms; some of R$^1$s may be substituents and the rest of R$^1$s and all of R$^2$s may be hydrogen atoms; or all of R$^1$s and some of R$^2$s may be substituents and the rest of R$^2$s may be hydrogen atoms. Further, all of R$^2$s may be substituents and all of R$^1$s may be hydrogen atoms; some of R$^2$s may be substituents and the rest of R$^2$s and all of R$^1$s may be hydrogen atoms; or all of R$^2$s and some of R$^1$s may be substituents and the rest of R$^1$s may be hydrogen atoms. Furthermore, some of both of R$^1$s and R$^2$s may be substituents and the rest thereof may be hydrogen atoms.

[Chemical Formula 5]

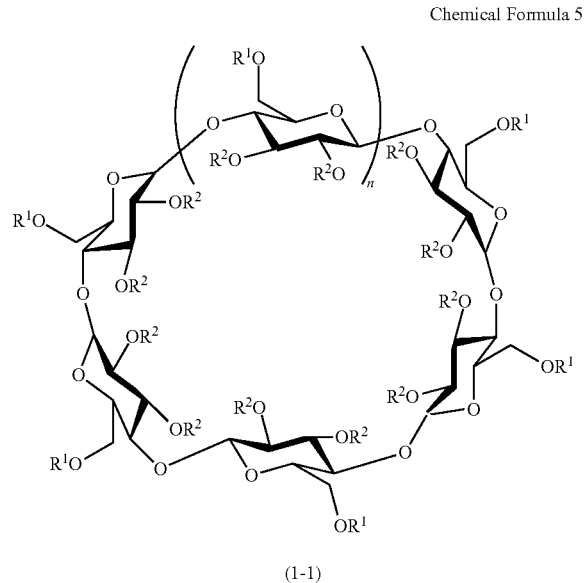

Chemical Formula 5

(1-1)

The substituent represented by R in Formula (1) is a group that substitutes the hydroxy hydrogen of glucose, and examples thereof include various groups that can be derived from the hydroxy hydrogen of glucose through one or more reactions.

Specifically, examples of the substituent represented as R (hereinafter referred to as substituent R) include a substituted or unsubstituted alkyl group, a substituted or unsubstituted cycloalkyl group, a substituted or unsubstituted alkenyl group, a substituted or unsubstituted cycloalkenyl group, a substituted or unsubstituted aryl group (e.g., phenyl group, tolyl group, etc.), a substituted or unsubstituted aralkyl group (e.g., benzyl group, phenethyl group, trityl group, etc.), an acyl group, a silyl group, a sulfonyl group, a sugar residue, and a substituted or unsubstituted polyoxyalkylene group. The number of carbon atoms of the substituent R is not particularly limited, and may be, for example, 1 to 40, 1 to 30, or 1 to 20.

Examples of the substituted alkyl group, substituted cycloalkyl group, substituted alkenyl group, substituted cycloalkenyl group, substituted aryl group and substituted aralkyl group, which are examples of the substituent R, include those having a hydroxy group as a substituent such as a hydroxyalkyl group, those having a sulfo group or a derivative group thereof as a substituent such as a sulfoalkyl group or a salt or ester group thereof, and those having a carboxy group or a derivative group thereof as a substituent such as a carboxymethyl group or a salt or ester group thereof. Examples of a hydrocarbon group constituting the ester group here include an alkyl group having 1 to 20 carbon atoms and a cycloalkyl group having 3 to 20 carbon atoms.

The acyl group, which is an example of the substituent R, may be, for example, a residue of a monocarboxylic acid that forms an ester bond with an oxygen atom in —OR, such as an acetyl group or a benzoyl group (for example, R: —CO-$Q^1$) or a residue of a dicarboxylic acid, such as succinic acid. In the case of a residue of a dicarboxylic acid, the carboxy group that is not ester-bonded with the glucose may form an ester group regardless of an acid type or a metal salt (e.g., R: —CO-$Q^2$-COO-$Q^3$). Here, $Q^1$ represents a hydrogen atom or an organic group having 1 to 10 carbon atoms (preferably 1 to 6), and examples of the organic group include an alkyl group, a cycloalkyl group, an alkenyl group, a cycloalkenyl group, an aryl group, and an aralkyl group. $Q^2$ represents a hydrocarbon group having 1 to 6 carbon atoms (for example, an alkanediyl group). $Q^3$ represents a hydrogen atom, an alkali metal, or an organic group having 1 to 10 carbon atoms (preferably 1 to 6), and examples of the organic group include an alkyl group, a cycloalkyl group, an alkenyl group, a cycloalkenyl group, an aryl group and an aralkyl group.

Examples of the silyl group, which is as an example of the substituent R, include a trialkylsilyl group such as a tert-butyldimethylsilyl group. Moreover, examples of the sulfonyl group include an arylsulfonyl group such as a p-toluenesulfonyl group. Further, examples of the sugar residue include a glucosyl group and a mantosyl group.

Examples of the substituted or unsubstituted polyoxyalkylene group, which is an example of the substituent R, include a group having a repeating unit of oxyalkylene having 1 to 4 carbon atoms, such as a polyoxyethylene group, and the terminal OH may be substituted with a substituent such as an amino group, an azide group, or a trityl group. The number of repetitions of the oxyalkylene group is not particularly limited, and may be, for example, 2 to 20.

For the plurality of Rs in Formula (1), only one type of the substituents R listed above may be introduced, or two or more types thereof may be introduced in combination.

The cyclic oligosaccharide having a β-1,4 glucosidic bond according to the present embodiment can be produced through a step of binding hydroxy groups at the terminals of an oligosaccharide represented by the above general formula (2) for cyclization. R in Formula (2) represents a hydrogen atom or a substituent thereof. As the substituent represented by R in Formula (2), the same substituents as those in the above formula (1) can be exemplified. Preferably, R is an alkyl group or an acyl group, for example, and examples of OR in Formula (2) include an acylated (more preferably, acetylated) hydroxy group of glucose (that is, an acyloxy group, preferably an acetyloxy group), and an alkylated (more preferably, methylated) hydroxy group of glucose (i.e., an alkoxy group, preferably a methoxy group).

A method for producing a cellulose-derived cyclic cellooligosaccharide as a cyclic oligosaccharide according to an embodiment will be described with reference to FIG. 1.

In the production method shown in FIG. 1, first, cellulose represented by Formula (4) is acetylated (p in the formula is a number corresponding to the number of repetitions composed of two glucose molecules in the cellulose). The cellulose has a structure in which glucoses are linked by β-1,4 glucosidic bonds, and adjacent glucose units are turned inside out and arranged in a row to form a linear structure. Therefore, the cellulose has strong intramolecular and intermolecular hydrogen bonds and is insoluble in water. The hydroxy groups of such cellulose are acetylated to eliminate the hydrogen bonds, thereby imparting flexibility to the molecular chain. In addition, a partially-acetylated cellulose may be used as a starting material.

Acetylation can be carried out, for example, by reacting cellulose with acetic anhydride in the presence of perchloric acid (see, for example, P. Arndt et al., Cellulose, 2005, 12, 317.). Acetylation gives cellulose triacetate (fully-acetylated cellulose) represented by Formula (5) in which all the three hydroxy groups of each constituent unit of cellulose are acetylated.

Next, a partially-acetylated cellooligosaccharide represented by Formula (6) is synthesized by cleaving the glucosidic bonds in the cellulose triacetate. Cleavage of the glucosidic bonds can be performed by adding concentrated sulfuric acid to the cellulose triacetate (see, for example, H. Namazi et al., J. Appl. Polym. Sci., 2008, 110, 4034. and T. Kondo, D. G. Gray, J. Appl. Polym. Sci. 1992, 45, 417). Separation and purification after cleavage gives a chain-like, partially-acetylated cellooligosaccharide having 5 to 8 glucose units, having hydroxy groups at the 1- and 4-positions of the glucose units at its both terminals, and having all other hydroxy groups that are acetylated, as shown in Formula (6). The cellooligosaccharide of Formula (6) is an oligosaccharide represented by the above formula (2) wherein —OR is —O—Ac (wherein Ac is an acetyl group).

Next, the hydroxy groups at both terminals of the partially-acetylated cellooligosaccharide represented by Formula (6) are bound to each other for cyclization. The cyclization method is not particularly limited, and, for example, the 1-position hydroxy group at the terminal of the partially-acetylated cellooligosaccharide represented by Formula (6) may be trichloroacetoimidated and then undergo a cyclization reaction. Trichloroacetoimidation can be performed by reacting the partially-acetylated cellooligosaccharide with trichloroacetonitrile, and then a boron trifluoride diethyl ether complex is added to the trichloroacetoimidated partially-acetylated cellooligosaccharide to cause a reaction, so that the glucose units at its both terminals are linked by a β-1,4 glucosidic bond to form a ring.

Note that a boron trifluoride diethyl ether complex may be added to the partially-acetylated cellooligosaccharide to cause a reaction, without trichloroacetoimidation, thereby linking the glucose units at its both terminals by a β-1,4 glucosidic bond to form a ring.

As a result, an acetylated cyclic cellooligosaccharide represented by Formula (7) is obtained. The acetylated cyclic cellooligosaccharide of Formula (7) is a cyclic oligosaccharide represented by the above formula (1) wherein —ORs are all —O-Acs.

Next, the acetyloxy group of the acetylated cyclic cellooligosaccharide represented by Formula (7) is hydrolyzed using, for example, a base catalyst (sodium hydroxide, triethylamine, or the like) to give the cyclic oligosaccharide represented by the above formula (3).

Figure 2:
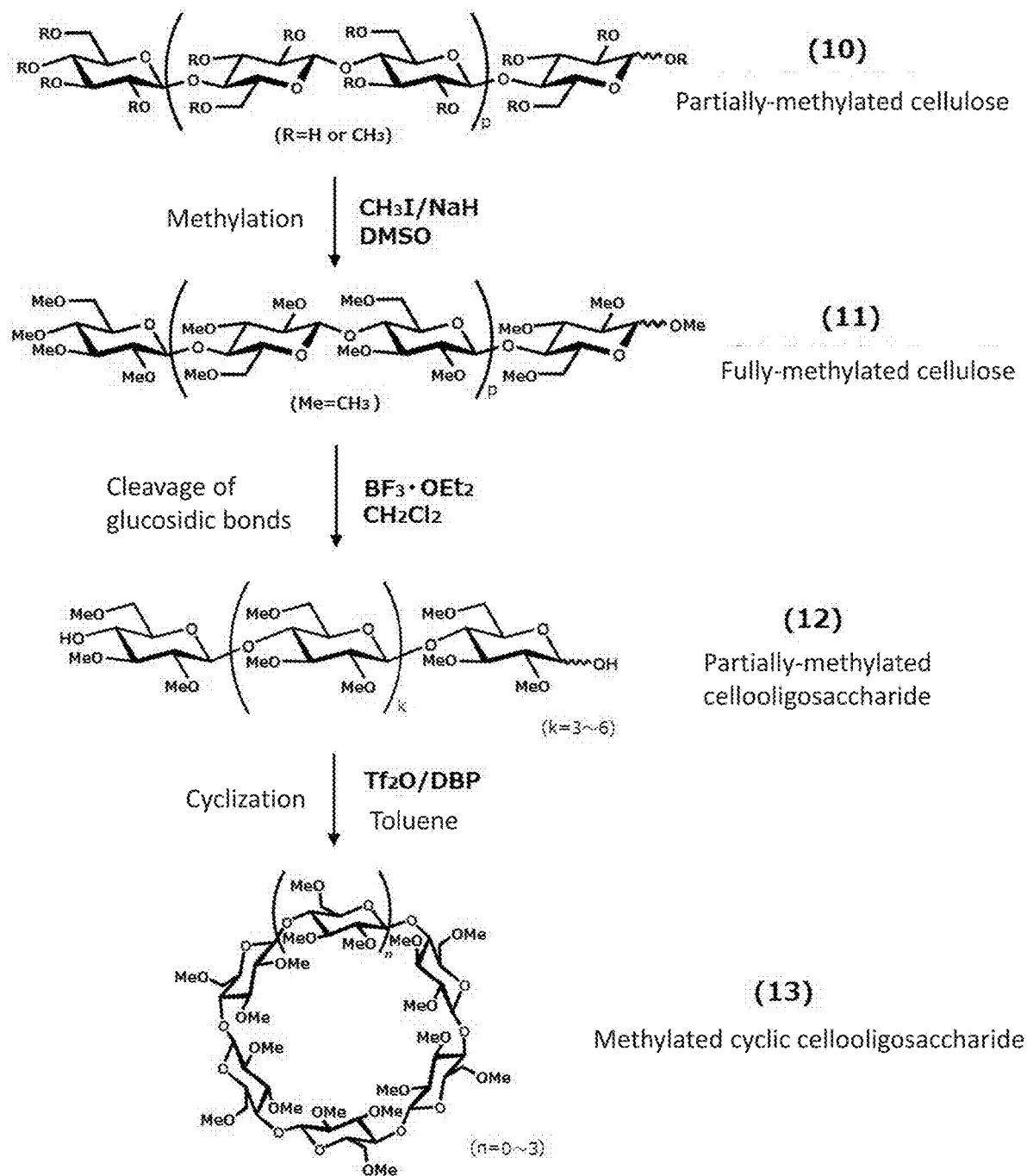
FIG. 2 is a diagram showing a step of synthesizing a cyclic oligosaccharide according to another embodiment.

FIG. 2 is a diagram showing a step of synthesizing a cyclic oligosaccharide according to another embodiment. In the example shown in FIG. 2, a partially-methylated cellulose represented by Formula (10) in which the hydroxy groups of cellulose are partially-methylated is used as a starting material to synthesize a methylated cyclic cellooligosaccharide represented by Formula (13).

In the production method shown in FIG. 2, first, a partially-methylated cellulose is methylated to synthesize a fully-methylated cellulose. Methylation can be carried out, for example, by reacting the partially-methylated cellulose with sodium hydride and iodomethane (see, for example, J. N. Bemiller, Earle E. Allen, J R., J. Polym. Sci. 1967, 5, 2133.). As a result, a fully-methylated cellulose represented by Formula (11) is obtained in which all the three hydroxy groups of each constituent unit of cellulose are methylated.

Next, a partially-methylated cellooligosaccharide represented by Formula (12) is synthesized by cleaving the glucosidic bonds in the fully-methylated cellulose. Cleavage of the glucosidic bonds is similar to that in FIG. 1. Separation and purification after cleavage gives a chain-like partially-methylated cellooligosaccharide having 5 to 8 glucose units, having hydroxy groups at the 1- and 4-positions of the glucose units at its both terminals, and having all other hydroxy groups that are methylated, as shown in Formula (12). The cellooligosaccharide of Formula (12) is an oligosaccharide represented by the above formula (2) wherein —OR is —O-Me (where Me represents a methyl group).

Next, the hydroxy groups at both terminals of the partially-methylated cellooligosaccharide represented by Formula (12) are bound to each other for cyclization. The cyclization method is not particularly limited, and can be carried out, for example, by reacting the partially-methylated cellooligosaccharide with trifluoromethanesulfonic anhydride (Tf$_2$O) and 2,6-di-tert-butylpyridine (DBP). As a result, the glucose units at its both terminals are linked by a β-1,4 glucosidic bond to form a ring, so that the methylated cyclic cellooligosaccharide represented by Formula (13) is obtained. This methylated cyclic cellooligosaccharide is a cyclic oligosaccharide represented by the above formula (1) wherein —ORs are all —O-Mes.

In the cyclic oligosaccharide represented by Formula (1), the substituent of R in the formula can be basically introduced by using a known chemical modification method applied to the cyclodextrin as described above. For example, in order to introduce an alkoxy group such as a methoxy group as —OR, the method of alkylating a hydroxy group described in JP S61-200101 A may be utilized. Further, in order to introduce a sulfoalkyl group or a carboxymethyl ester group via ether oxygen as a case where R is a substituted alkyl group, the method described in JP H11-60610 A or JP 2013-28744 A may be utilized. Further, in order to introduce a residue of dicarboxylic acid such as succinic acid as a case where R is an acyl group, the method described in JP H4-81403 A may be utilized. Further, in order to introduce a tosyl group via ether oxygen as a case where R is a sulfonyl group, the method described in JP 2016-69652 A may be utilized.

As the method for introducing a substituent, it is not always necessary to synthesize the acetylated cyclic cellooligosaccharide in the manner as described above, hydrolyze the acetylated cyclic cellooligosaccharide to form the cyclic oligosaccharide of Formula (3), and then introduce a substituent. Instead, after cyclization, R may be directly converted to another substituent.

As described above, the cyclic oligosaccharide according to the present embodiment can be synthesized from cellulose, which is the most abundant organic compound on the earth and is a recyclable non-edible plant resource, and therefore resources can be effectively utilized.

Figure 3:
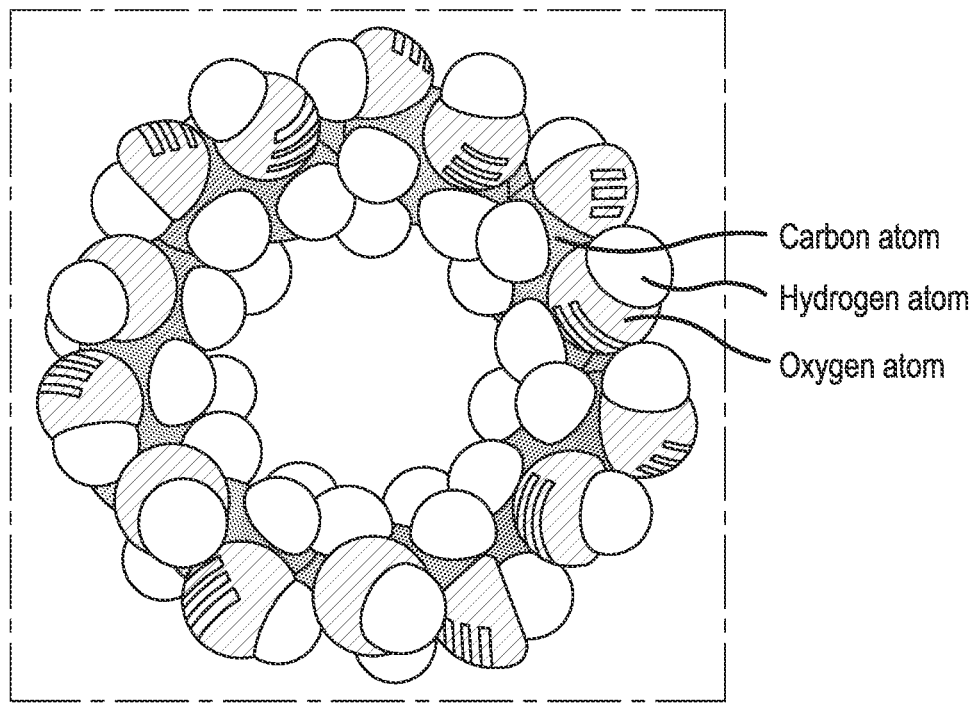
FIG. 3 is a drawing of a molecular model showing a molecular structure of a cyclic oligosaccharide according to an embodiment.
Figure 4:
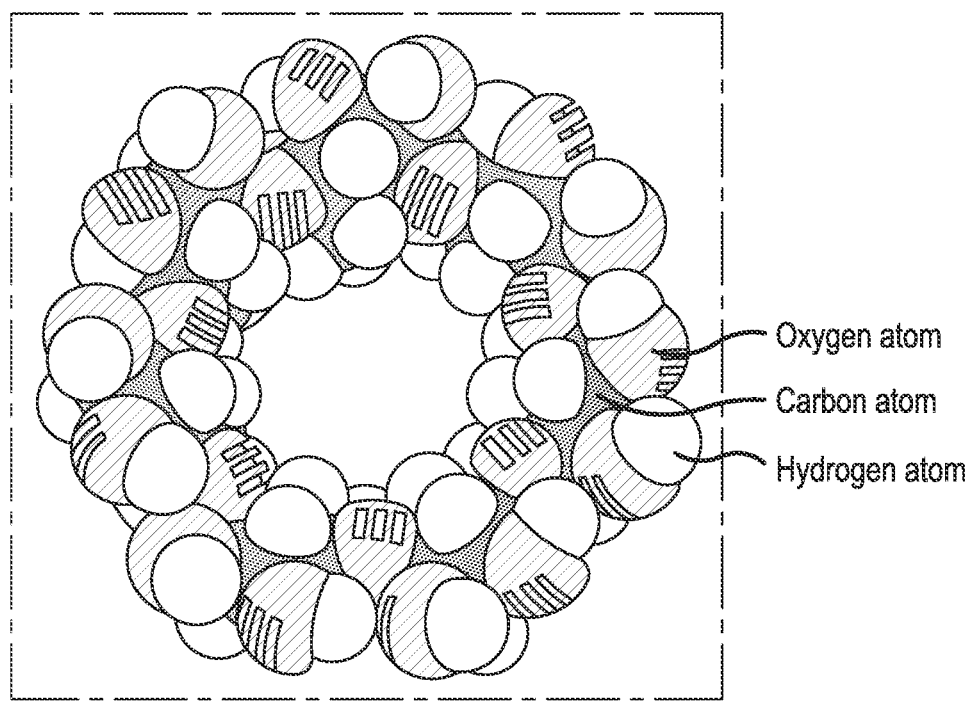
FIG. 4 is a drawing of a molecular model showing a molecular structure of a cyclodextrin.

Further, when the molecular structures of the cyclic oligosaccharide according to the present embodiment and a cyclodextrin are compared, the cyclic oligosaccharide according to the present embodiment has higher hydrophobicity in the pores than the cyclodextrin. Specifically, the molecular structure of the cyclodextrin represented by Formula (X) is as shown in FIG. 4, whereas the molecular structure of the cyclic oligosaccharide represented by Formula (3) is as shown in FIG. 3. In FIGS. 3 and 4, white atoms indicate hydrogen atoms, black atoms indicate carbon atoms, and gray atoms therebetween indicate oxygen atoms.

As shown in FIG. 4, in the cyclodextrin, the glucoside oxygen connecting the glucose units faces the inside of the pores, and therefore, the inside of the pores is in a hydrophobic environment similar to that of ether. On the other hand, as shown in FIG. 3, in the cyclic oligosaccharide according to the present embodiment, the glucoside oxygen faces outward, and the oxygen atom does not face the inside of the pores. Therefore, in the cyclic oligosaccharide according to the present embodiment, the inside of the pores is in an environment having a higher hydrophobicity than that of the cyclodextrin, and a substance having a higher hydrophobicity can be taken therein. As a result, it can be expected to have higher guest inclusion ability and guest selectivity, for example, in water.

The cyclic oligosaccharide according to the present embodiment has the property of including hydrophobic guest molecules or some of them in the pores, and thus can be used in foods, cosmetics, toiletry products, pharmaceuticals, and the like for the purpose of non-volatilization and sustained release of volatile substances, stabilization of unstable substances, solubilization of poorly soluble substances, and the like, similarly to the cyclodextrin.

EXAMPLES

Hereinafter, the present invention will be described in more detail with reference to Examples, but is not limited thereto. In the following Examples, the symbol "%" means "mass %" unless otherwise specified.

The analysis and measurement methods are as follows.

[Infrared Absorption Spectrum (FT-IR)]

Measured with a Fourier transform infrared spectrophotometer ("FT/IR4700ST model" manufactured by JASCO Corporation) (ATR method).

[NMR]

Measured with "JNM-ECS400" manufactured by JEOL Ltd.

[Mass Spectrometry]

Measured with a matrix-assisted laser desorption/ionization time-of-flight mass spectrometer (MALDI-TOF MS) ("Voyager™ RP" manufactured by Japan Perceptive Limited).

[HPLC]

Column: ODS ("Wakosil 5C18 AR" manufactured by Wako Pure Chemical Industries, Ltd., inner diameter: 4.6 mm, length: 150 mm)

Mobile phase: acetonitrile/water=8/2 (volume ratio)

Flow velocity: 1.0 mL/min

Temperature: 30° C.

Detection: ELSD ("Model 400 ELSD" manufactured by SofTA, USA).

[TLC]

Developing solvent: methanol/chloroform=1/40 (volume ratio).

1. Example 1: Synthesis of Methylated Cyclic Cellooligosaccharide 1-1. Synthesis of Fully-Methylated Cellulose from Partially-Methylated Cellulose Synthesis was performed according to the method described in J. N. Bemiller, Earle E. Allen, J R., J. Polym. Sci. 1967, 5, 2133. The details of the reaction formula and the synthesis method are as follows.

A partially-methylated cellulose (2.01 g, $5.03 \times 10^{-5}$ mol, "Cellulose acetate (Mn: ~30,000)" manufactured by Sigma-Aldrich) vacuum dried overnight at 80° C. was dissolved in DMSO (110 mL) under a nitrogen atmosphere. This solution was added to sodium hydride (content: 60%, 1.81 g, $4.53 \times 10^2$ mol), and the mixture was stirred at 50° C. for 16 hours. Iodomethane (2.95 mL, $4.74 \times 10^{-2}$ mol) was added dropwise to the solution over 30 minutes, and the mixture was stirred at 50° C. for 24 hours. Methanol (3.85 mL) was added to the system to inactivate unreacted sodium hydride, and the resulting solution was added to water (350 mL) for reprecipitation. The resulting solid was separated by centrifugation and vacuum dried at 60° C. to give a product (white powder solid) (yield amount: 1.90 g, yield rate: 95%).

Figure 5:
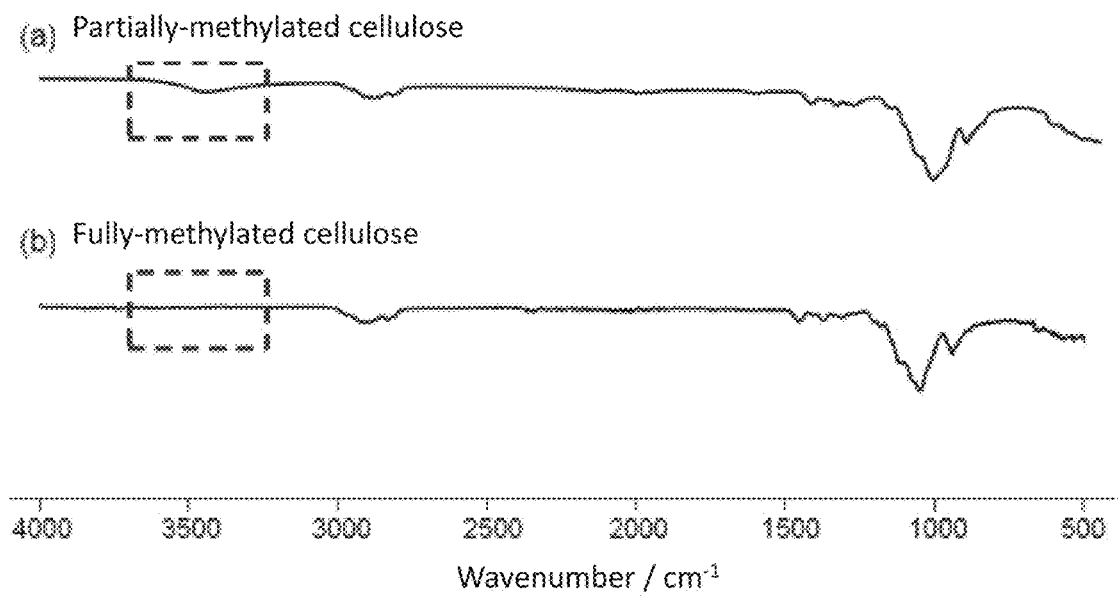
FIG. 5 is FT-IR spectrum diagrams of a fully-methylated cellulose and a partially-methylated cellulose in Example 1.

The FT-IR spectrum of the product is shown in FIG. 5 together with the FT-IR spectrum of the raw material partially-methylated cellulose. In the raw material partially-methylated cellulose, an absorption peak based on OH expansion/contraction vibration was observed around 3400 cm$^{-1}$ as shown in FIG. 5(*a*). On the other hand, in the FT-IR spectrum of the product, absorption peaks were observed at 2915, 1455, and 1050 cm$^{-1}$ but the absorption peak based on OH expansion/contraction vibration around 3400 cm$^{-1}$ disappeared, as shown in FIG. 5(*b*). It was confirmed that all the hydroxy groups were methylated.

Figure 6:
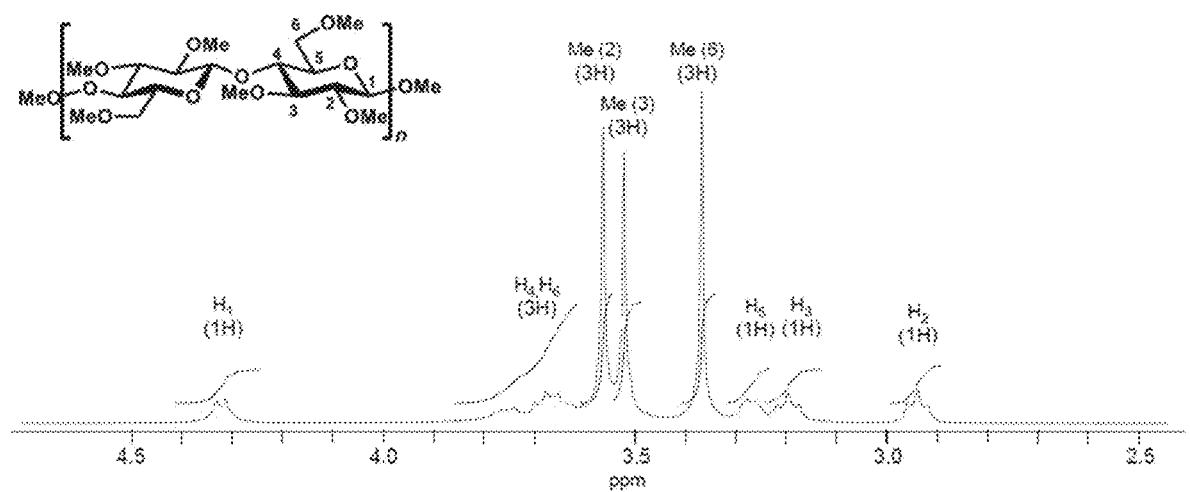
FIG. 6 is a $^1$H-NMR spectrum diagram of the fully-methylated cellulose in Example 1.

The results of the $^1$H-NMR analysis of the product are shown below, and the NMR spectrum is shown in FIG. 6.

$^1$H-NMR (400 MHz, chloroform-d): δ 2.92 (t, 1H), 3.19 (t, 1H), 3.27 (m, 1H), 3.37 (s, 3H), 3.52 (s, 3H), 3.56 (s, 3H), 3.69-3.61 (m, 2H), 3.75 (m, 1H), 4.31 (d, 1H).

From the above, it was confirmed that the product was a fully-methylated cellulose.

1-2. Synthesis of Partially-Methylated Cellooligosaccharide from Fully-Methylated Cellulose Partially-methylated cellooligosaccharides (5 to 8 glucose units) were synthesized from the fully-methylated cellulose, with reference to the method described in T. Kondo, DG Gray, J. Appl. Polym. Sci. 1992, 45, 417. The details of the reaction formula and the synthesis method are as follows.

[Chemical Formula 6]

Chemical Formula 6

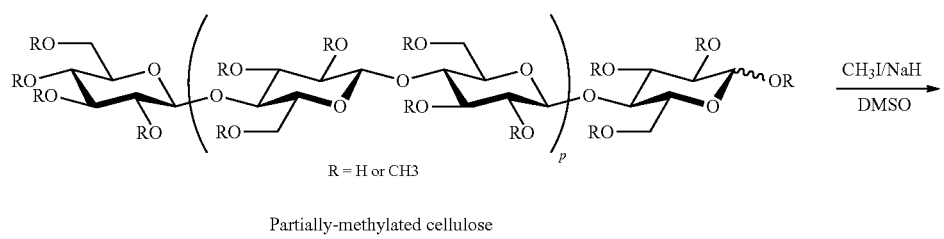

R = H or CH3

Partially-methylated cellulose

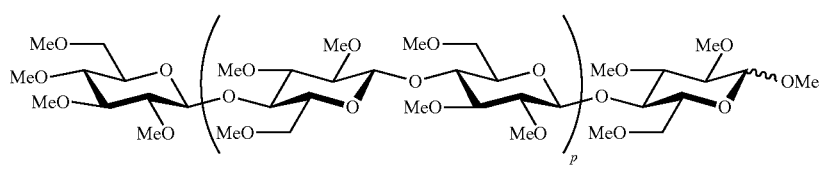

Fully-methylated cellulose

[Chemical Formula 7]

Chemical Formula 7

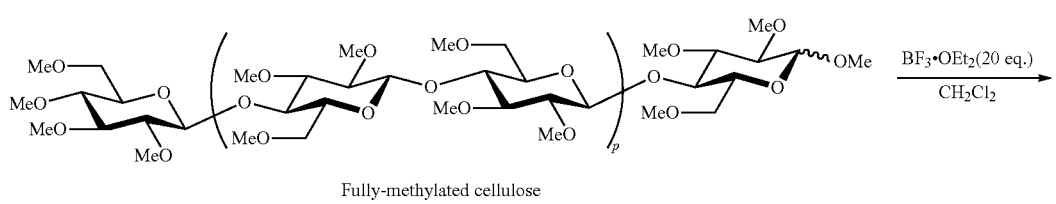

Fully-methylated cellulose

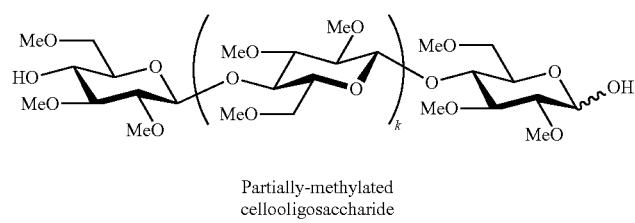

Partially-methylated
cellooligosaccharide

The fully-methylated cellulose (0.55 g, $1.2 \times 10^{-2}$ mmol) vacuum dried at 80° C. was dissolved in dehydrated dichloromethane (30 mL) under a nitrogen atmosphere. A boron trifluoride diethyl ether complex salt (7.2 mL, 56 mmol, manufactured by Wako Pure Chemical Industries, Ltd., content: 46.0 to 49.0% ($BF_3$)) was added to the solution, and the mixture was stirred at room temperature for 6 hours. A saturated aqueous sodium hydrogen carbonate solution (15 mL) was added to the obtained solution to terminate the reaction. Extraction was performed twice with dichloromethane (30 mL), and the collected dichloromethane solution was dried over anhydrous magnesium sulfate, and the solvent was distilled off to give a brown viscous liquid (crude yield amount: 0.52 g, crude yield rate: 93%).

MALDI-TOF-MS measurement revealed that the product obtained was a mixture of partially-methylated cellooligosaccharides composed of 2 to 11 glucose units. This product was subjected to size exclusion chromatography to separate the partially-methylated cellooligosaccharides composed of 5 to 8 glucose units (yield amount: 88 mg, yield rate: 16%).

For the size exclusion chromatography, the following device was used as a separation device.

Device: recycling preparative HPLC LC-9210 NEXT manufactured by Nippon Analytical Industry Co., Ltd.

Column: JAIGEL-2HR (exclusion limit molecular weight: 5,000)×2 manufactured by Nippon Analytical Industry Co., Ltd.

Flow velocity: 9.5 mL/min

Eluent: Chloroform

Injection amount per injection: 67 mg (1 mL of chloroform)

Detector: RI-700 II NEXT manufactured by Nippon Analytical Industry Co., Ltd.

1-3. Synthesis of Methylated Cyclic Cellooligosaccharide from Partially-Methylated Cellooligosaccharide

[Chemical Formula 8]

Chemical Formula 8

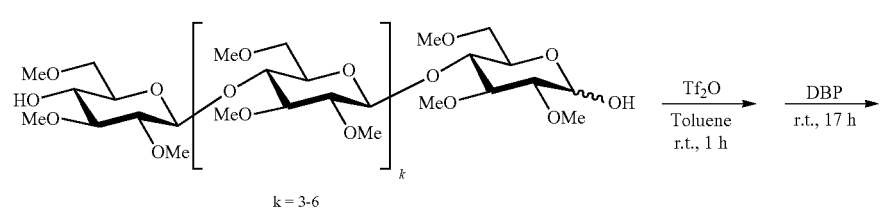

k = 3-6

Partially-methylated cellooligosaccharide

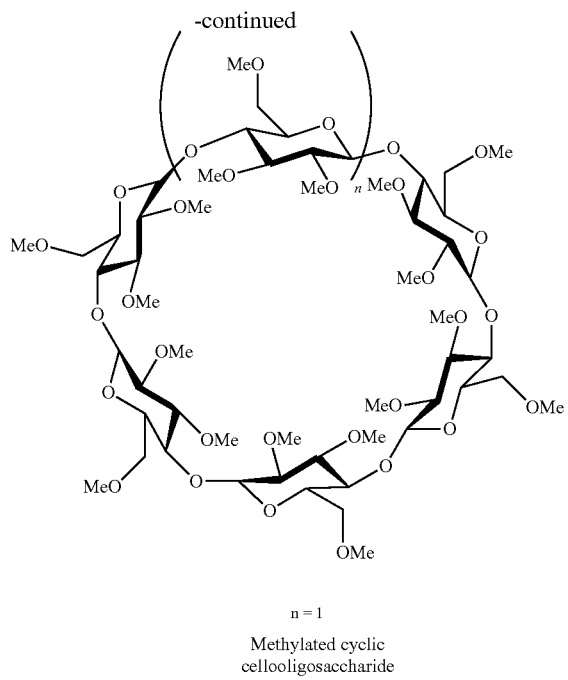

n = 1
Methylated cyclic
cellooligosaccharide

Under a nitrogen atmosphere, the partially-methylated cellooligosaccharides (75 mg, $5.2 \times 10^{-5}$ mol) obtained in 1-2 above were dissolved in toluene (18 mL). Trifluoromethanesulfonic anhydride ($Tf_2O$) (15 μL, $9.0 \times 10^{-5}$ mol) dissolved in toluene (3 mL) was added dropwise to the solution, and the mixture was stirred at room temperature for 1 hour. Then, 2,6-di-tert-butylpyridine (DBP) (185 μL, $8.4 \times 10^{-4}$ mol) dissolved in toluene (3 mL) was added dropwise, and the mixture was stirred at room temperature for 17 hours. Then, a saturated aqueous sodium hydrogen carbonate solution (50 mL) was added, and the mixture was extracted with toluene (100 mL). The toluene layer was dried over anhydrous magnesium sulfate, and then the solvent was distilled off. The obtained crude product (white solid) was subjected to size exclusion chromatography and further purified by medium pressure column chromatography to give a methylated cyclic cellooligosaccharide (hexamer) (yield amount: 1 mg, yield rate: 1.5%, white solid). The reaction formula is as shown above.

The size exclusion chromatography was performed in the same manner as in 1-2 above. The conditions for separation by the medium pressure column chromatography are as follows.

Column: ODS ("Universal Column ODS" manufactured by Yamazen Corporation, inner diameter: 20 mm, length: 84 mm)

Mobile phase: acetonitrile/water=8/2 (volume ratio).

Figure 7:
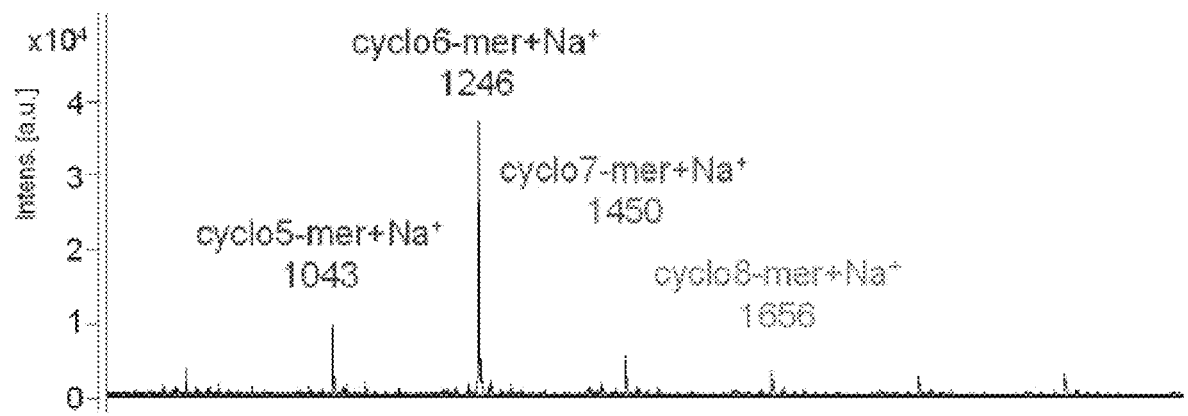
FIG. 7 is an MALDI-TOF MS spectral diagram of a crude product before isolation of a hexamer in Example 1.

The results of the mass spectrometry (MALDI-TOF MS) on the crude product before purification into a hexamer are shown in FIG. 7. As shown in FIG. 7, peaks corresponding to the pentameric to octameric methylated cyclic cellooligosaccharides were observed.

Figure 8:
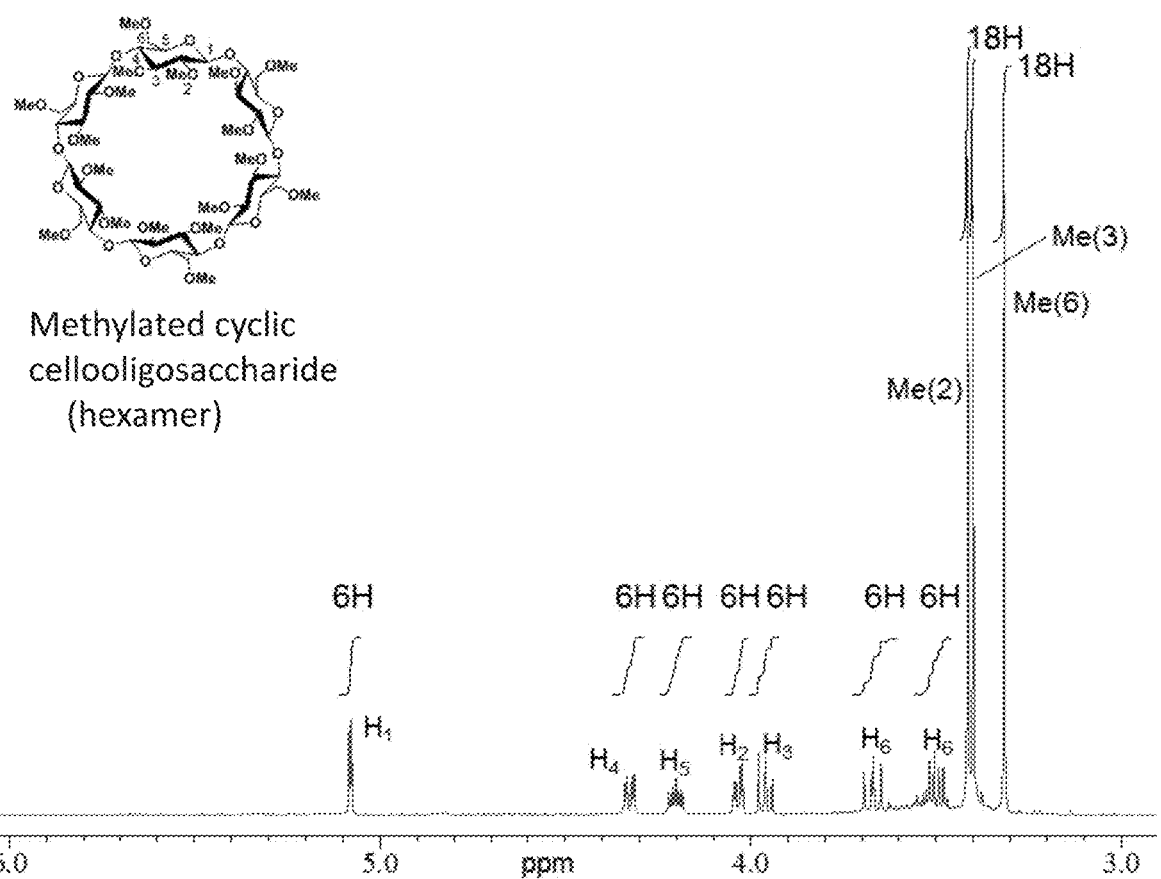
FIG. 8 is a $^1$H-NMR spectrum diagram of a methylated cyclic cellooligosaccharide (hexamer) of Example 1.

The results of the $^1$H-NMR analysis of the purified product (hexamer) are shown below, and the NMR spectrum is shown in FIG. 8.

$^1$H NMR (400 MHz, chloroform-d): 5.08 (d, J=2.3 Hz, 6H), 4.33 (dd, J=2.3, 7.7 Hz, 6H), 4.20 (ddd, J=2.3, 4.5, 7.3 Hz, 6H), 4.03 (dd, J=2.3, 6.8 Hz, 6H), 3.96 (dd, J=6.8, 7.7 Hz, 6H), 3.67 (dd, J=8.2, 9.9 Hz, 6H), 3.50 (dd, J=4.5, 9.5 Hz, 6H), 3.42 (s, 18H), 3.40 (s, 18H), 3.32 (s, 18H) ppm.

Figure 9:
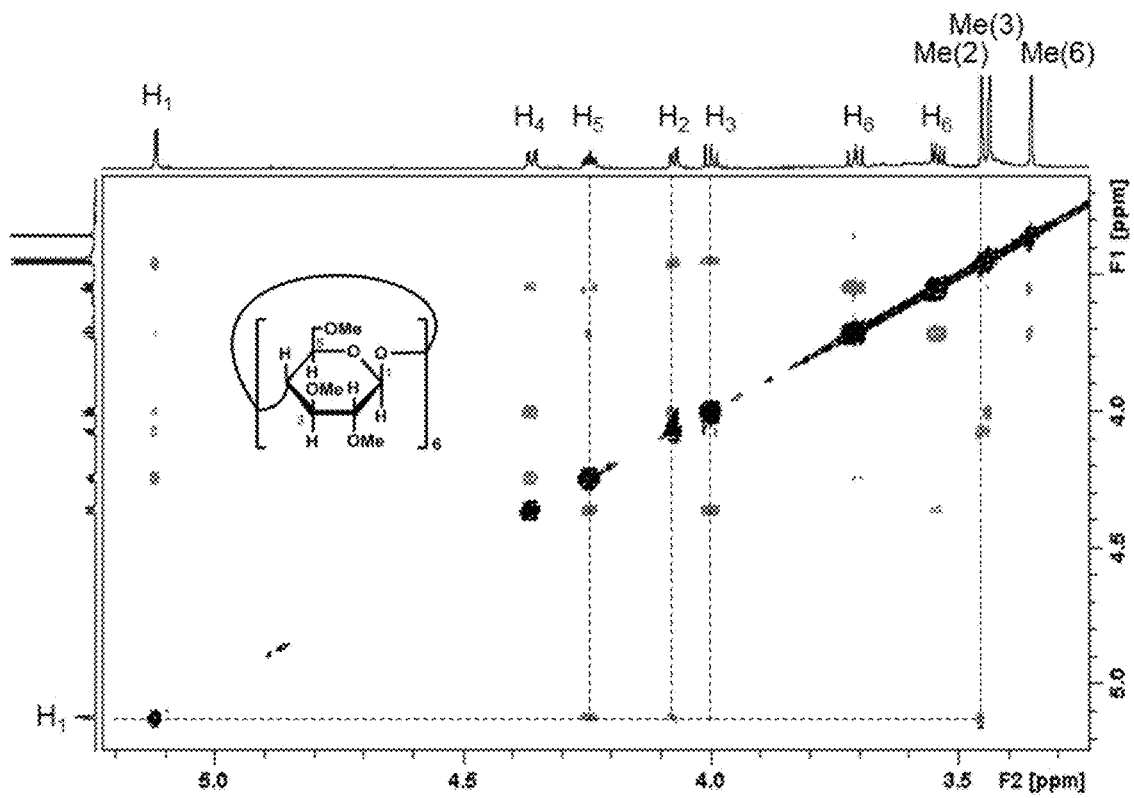
FIG. 9 is an NOESY spectrum diagram of the methylated cyclic cellooligosaccharide (hexamer) of Example 1.
Figure 10:
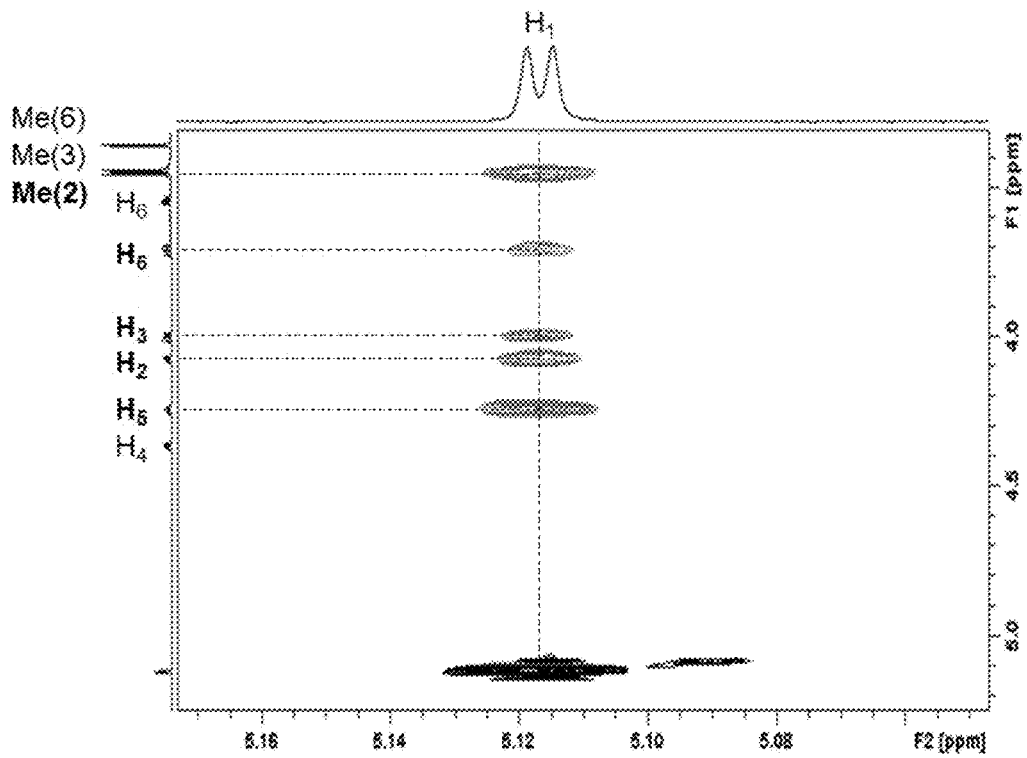
FIG. 10 is a partially enlarged view of FIG. 9.

The NOESY spectrum of the product is shown in FIG. 9, and an enlarged view of the vicinity of hydrogen ($H_1$) bound to the carbon at the 1-position of the glucose unit is shown in FIG. 10.

Figure 11:
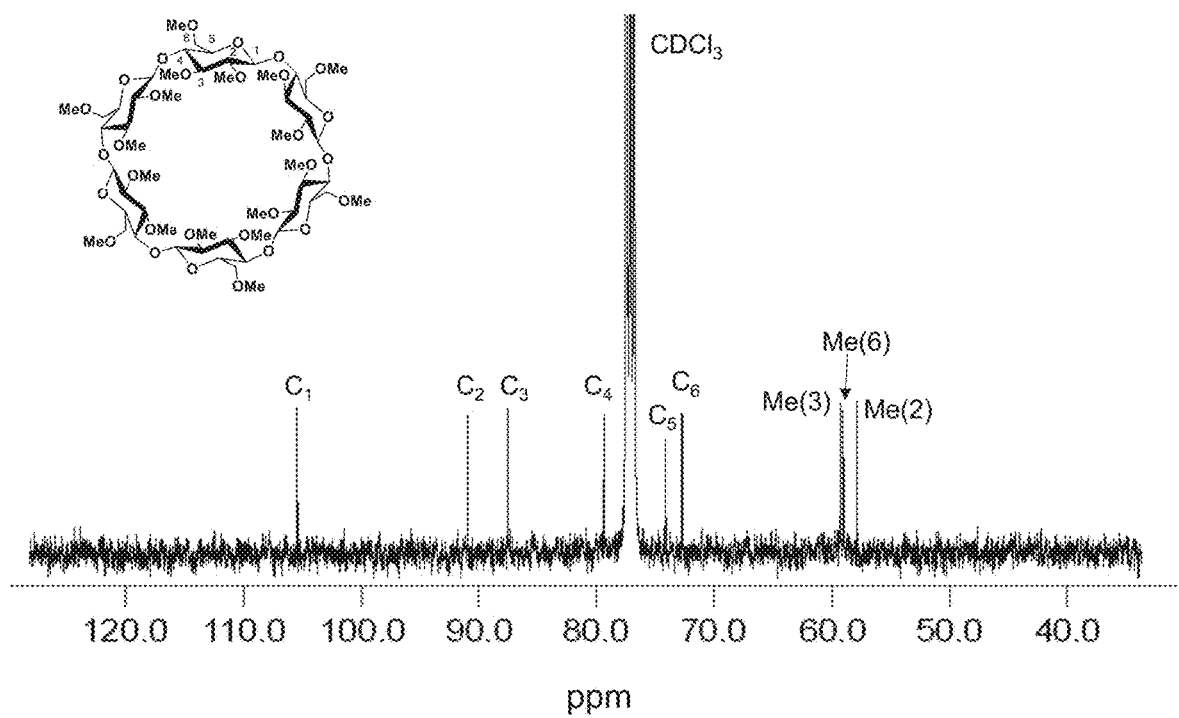
FIG. 11 is a $^{13}$C-NMR spectral diagram of the methylated cyclic cellooligosaccharide (hexamer) of Example 1.

The results of the $^{13}$C-NMR analysis of the product are shown below, and the NMR spectrum is shown in FIG. 11.

$^{13}$C NMR (400 MHz, chloroform-d): 105.38, 90.72, 87.34, 79.27, 74.20, 72.59, 59.11, 58.86, 57.69 ppm.

Figure 12:
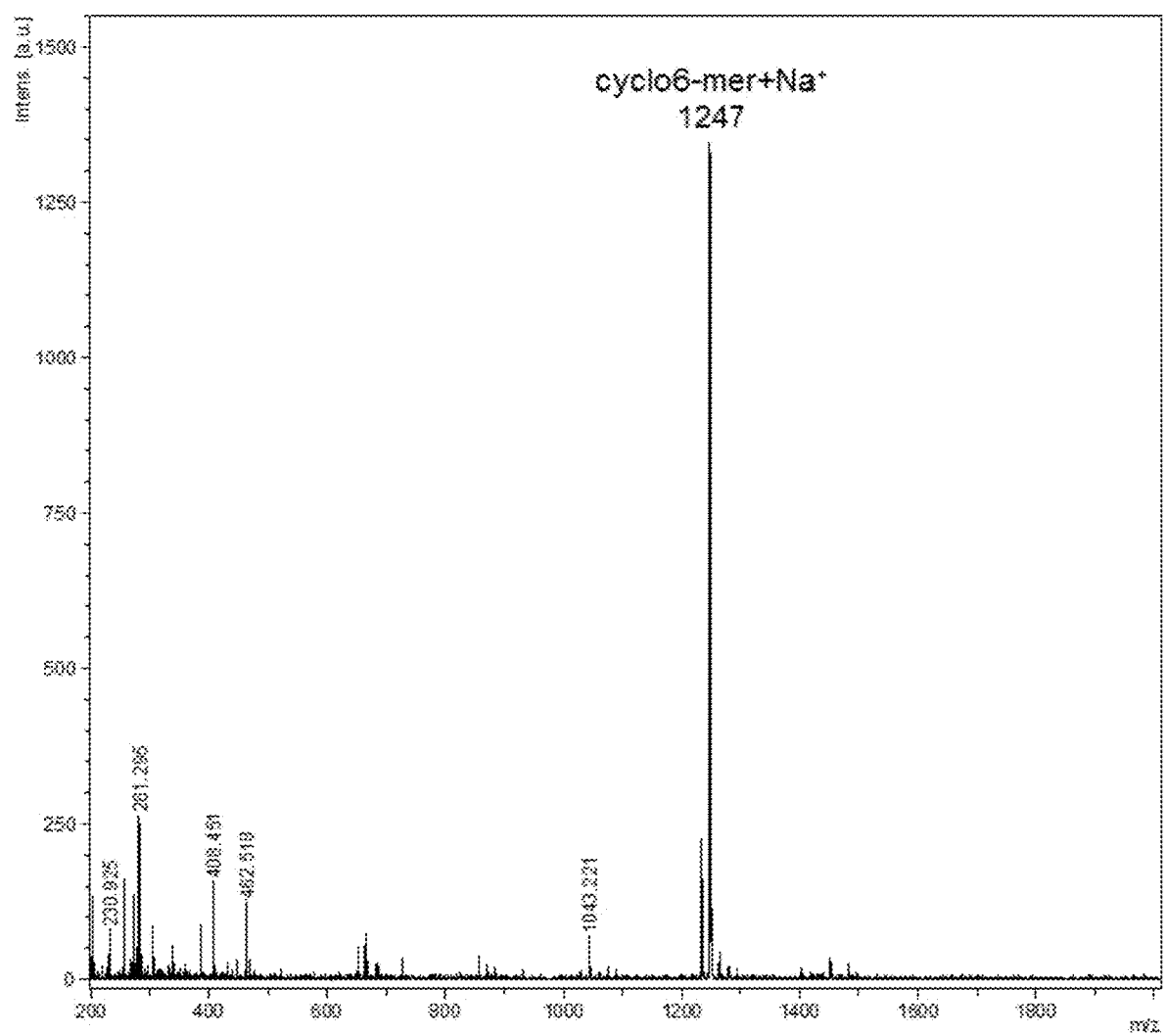
FIG. 12 is an MALDI-TOF MS spectral diagram of the methylated cyclic cellooligosaccharide (hexamer) of Example 1.

The results of the mass spectrometry (MALDI-TOF MS) on the product are shown below, and the spectrum thereof is shown in FIG. 12.

MALDI-TOF MS (m/z):1246 $[M+Na]^+$.

As the result of TLC of the product, Rf value=0.48.

Figure 13:
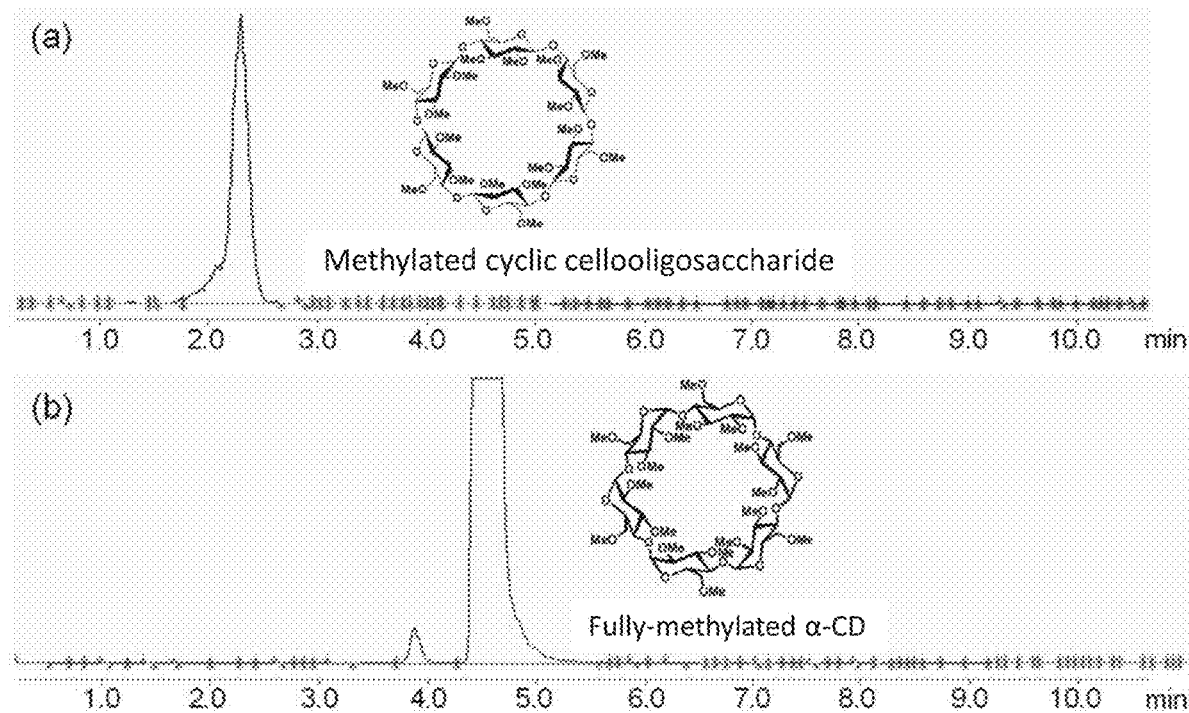
FIG. 13 is an HPLC chromatogram of the methylated cyclic cellooligosaccharide (hexamer) of Example 1 and a fully-methylated α-cyclodextrin.

The results of HPLC of the product (FIG. 13(a)) are shown in FIG. 13 together with the measurement results (FIG. 13(b)) of the fully-methylated α-cyclodextrin (all the hydroxy groups of α-cyclodextrin are methylated).

From the MS spectrum and the results of HPLC, it can be seen that this product has the same molecular weight as the fully-methylated α-cyclodextrin, but is a different compound. In addition, from the $^1$H-NMR spectrum and $^{13}$C-NMR spectrum, it is considered that this product is a highly symmetric compound composed of glucose units in which the hydroxyl groups at the 2-position, 3-position, and 6-position are methylated. Furthermore, from the NOESY spectrum (FIGS. 9 and 10), the proton at the 1-position of the glucose unit correlates with the 2-position, 3-position, 5-position and 6-position protons, but does not correlate with the 4-position proton. Thus, it is considered that the 1-position proton and the 4-position proton are distant from each other, and that the glucose units are connected by β-1,4 bonds. From these facts, it can be identified that the chemical structure of the methylated cyclic cellooligosaccharide is as shown in Formula (1) (R=methyl group, n=1).

2. Example 2: Synthesis of Cyclic Cellooligosaccharide from Partially-Acetylated Cellulose 2-1. Synthesis of Fully-Acetylated Cellulose from Partially-Acetylated Cellulose A fully-acetylated cellulose was synthesized according to the method described in P. Arndt et al., Cellulose, 2005, 12, 317. The details of the reaction formula and the synthesis method are as follows.

[Chemical Formula 9]

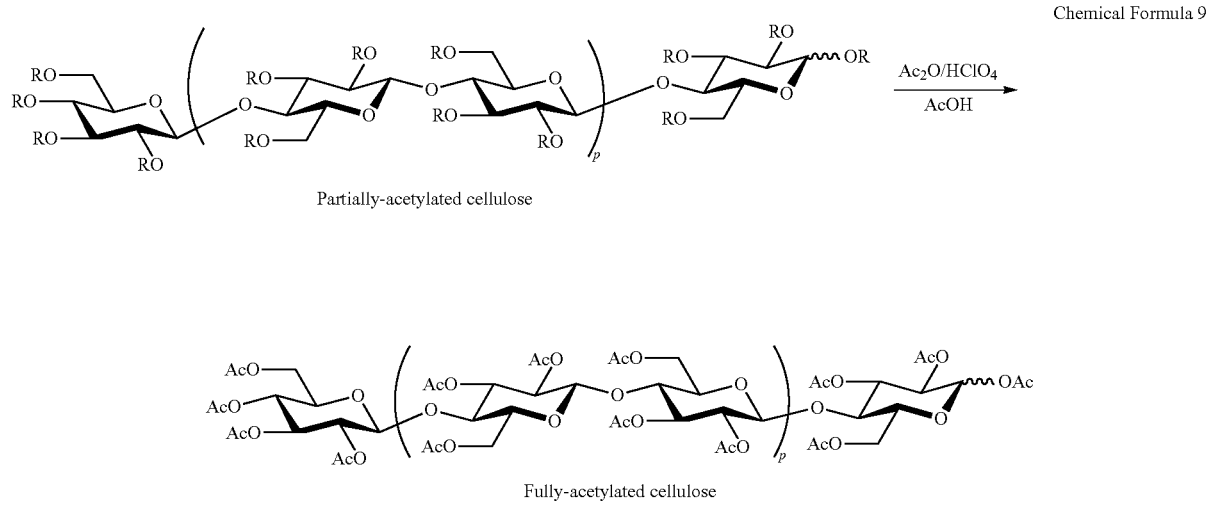

Chemical Formula 9

A partially-acetylated cellulose (manufactured by Sigma-Aldrich, Mn=30000, degree of acetylation=1.48) (4.0 g, $9.3 \times 10^{-5}$ mol) was dissolved in acetic acid (80 mL). Acetic anhydride (26 mL, $2.7 \times 10^{-1}$ mol) and perchloric acid (1.6 mL, $2.8 \times 10^{-2}$ mol) were added, and the mixture was stirred at room temperature for 2 hours. The reaction mixture was poured into water (100 mL), and the resulting solid was collected by suction filtration. This solid was washed with a saturated aqueous sodium hydrogen carbonate solution (500 mL) and then with water (500 mL). This washing operation was performed once more, and the solid was then vacuum dried at 70° C. to give a white powdery solid (yield amount: 3.9 g, yield rate: 80%).

In the infrared absorption spectrum of the obtained solid, the presence of the absorption peak of the carbonyl group (1735 cm$^{-1}$) and the disappearance of the absorption peak of the hydroxy group (around 3400 cm$^{-1}$) observed in the raw material were confirmed.

2-2. Synthesis of Partially-Acetylated Cellooligosaccharide from Fully-Acetylated Cellulose Partially-acetylated cellooligosaccharides were synthesized from the fully-acetylated cellulose, with reference to the method described in T. Kondo, D. G. Gray, J. Appl. Polym. Sci. 1992, 45, 417. The details of the reaction formula and the synthesis method are as follows.

[Chemical Formula 10]

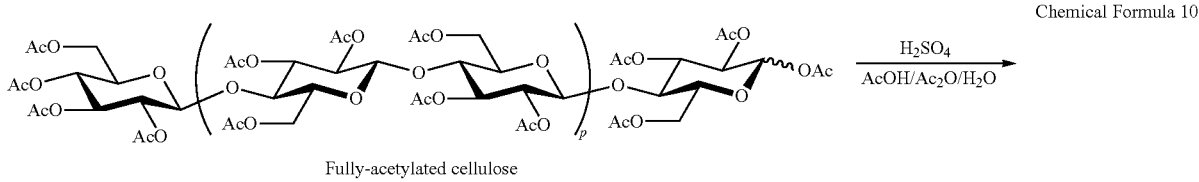

Chemical Formula 10

-continued

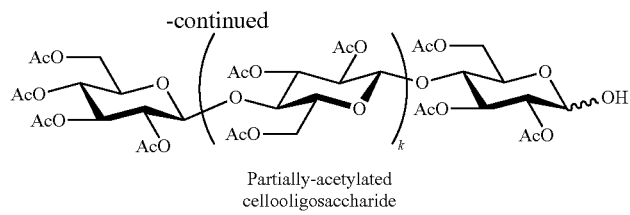

Partially-acetylated
cellooligosaccharide (?) indicates text missing or illegible when filed The fully-acetylated cellulose (0.45 g, 8.3×10$^{-6}$ mol) synthesized in 2-1 above was dissolved in acetic acid (9.0 mL) at 80° C. Acetic anhydride (150 µL, 1.6×10$^{-3}$ mol), concentrated sulfuric acid (35 µL, 6.5×10$^{-4}$ mol) and water (54 µL, 3.0×10$^{-3}$ mol) were sequentially added, and the mixture was stirred at 80° C. for 16 hours. The reaction solution was allowed to cool to room temperature. A 20% aqueous magnesium acetate solution (70 µL) was added, and the reaction mixture was then poured into diethyl ether (100 mL). The resulting solid was collected by suction filtration, washed with water (100 mL), and then vacuum dried (yield amount: 0.16 g).

Figure 14:
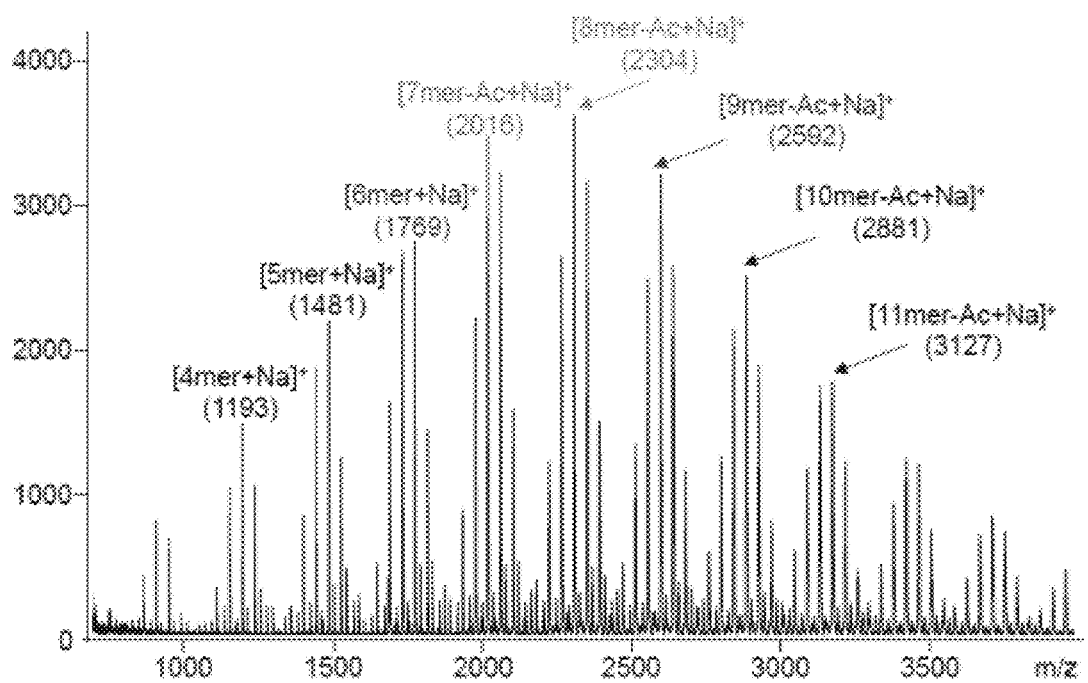
FIG. 14 is an MALDI-TOF MS spectral diagram of a partially-acetylated cellooligosaccharide in Example 2.

MALDI-TOF-MS measurement revealed that the product obtained was a mixture of partially-acetylated cellooligosaccharides composed of 2 to 13 glucose units (see FIG. 14).

2-3. Synthesis of Acetylated Cyclic Cellooligosaccharide from Partially-Acetylated Cellooligosaccharide

[Chemical Formula 11]

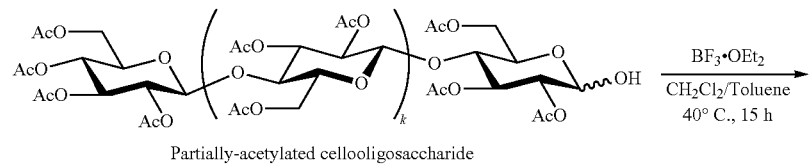

Partially-acetylated cellooligosaccharide

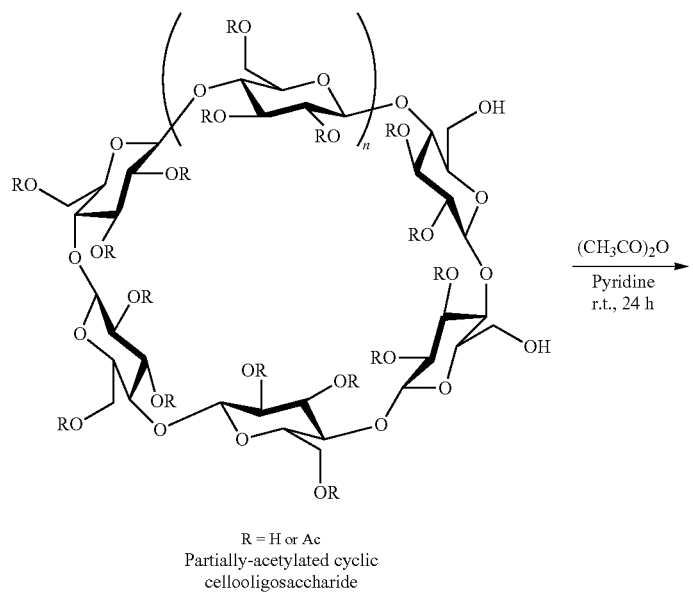

R = H or Ac
Partially-acetylated cyclic
cellooligosaccharide

-continued

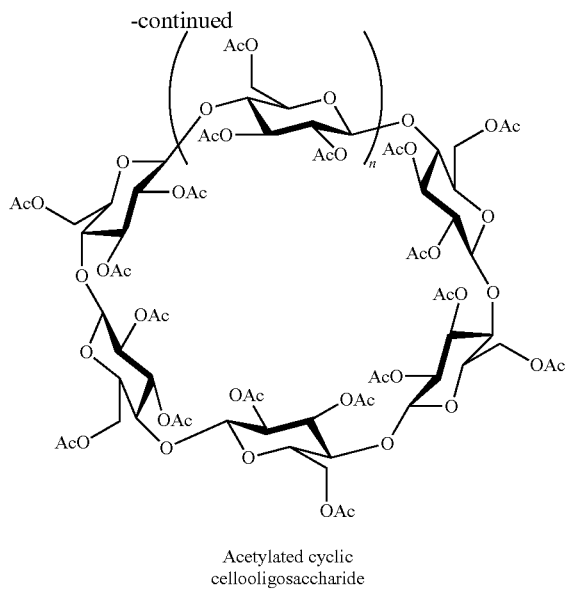

Acetylated cyclic
cellooligosaccharide

The partially-acetylated cellooligosaccharide (500 mg, $2.0 \times 10^{-4}$ mol) obtained in 2-2 above was dissolved in a mixed solution of dehydrated dichloromethane (27 mL) and dehydrated toluene (3.0 mL). A boron trifluoride diethyl ether complex (800 µL, $7.0 \times 10^{-3}$ mol, manufactured by Wako Pure Chemical Industries, Ltd., content: 46.0 to 49.0% ($BF_3$)) was added to the solution, and the mixture was stirred at 40° C. for 15 hours. Then, a saturated aqueous sodium hydrogen carbonate solution (50 mL) was added, the mixture was extracted with 100 mL of chloroform, and the solvent was then distilled off to give a brown-yellowish white solid (200 mg). This solid was dissolved in dehydrated pyridine (3.0 mL), acetic anhydride (1.5 mL, $1.5 \times 10^{-2}$ mol) was added, and the mixture was stirred at room temperature for 24 hours to acetylate the liberated hydroxyl groups. Extraction was performed with saturated brine (100 mL) and chloroform (100 mL), and the solvent was distilled off from the chloroform layer to give a brown-yellowish white solid (250 mg). Silica gel column chromatography was performed twice (first mobile layer: methanol/chloroform (1/99), second mobile layer: methanol/chloroform (1/150)) to give a crude product (6 mg). The reaction formula is as shown above.

Figure 15:
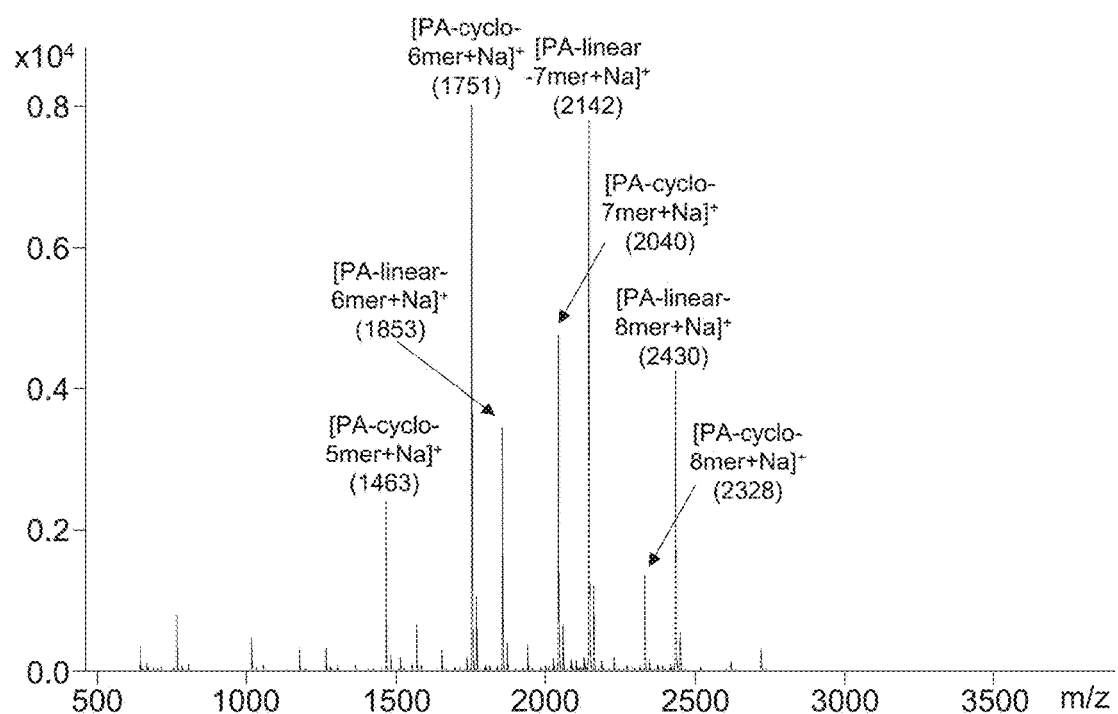
FIG. 15 is an MALDI-TOF MS spectral diagram of a crude product containing an acetylated cyclic cellooligosaccharide in Example 2.

MALDI-TOF-MS measurement was performed on the obtained crude product. The results are shown in FIG. 15. As shown in FIG. 15, as in the case of the methylated product of Example 1, peaks corresponding to the pentameric to octameric cyclic products were observed. Specifically, in Example 2, the peaks corresponding to the non-cyclized linear hexameric to octameric cellooligosaccharides and also the peaks corresponding to the pentameric to octameric acetylated cyclic cellooligosaccharides were observed.

2-4. Synthesis of Cyclic Cellooligosaccharide from Acetylated Cyclic Cellooligosaccharide

[Chemial Formula 12]

Chemical Formula 12

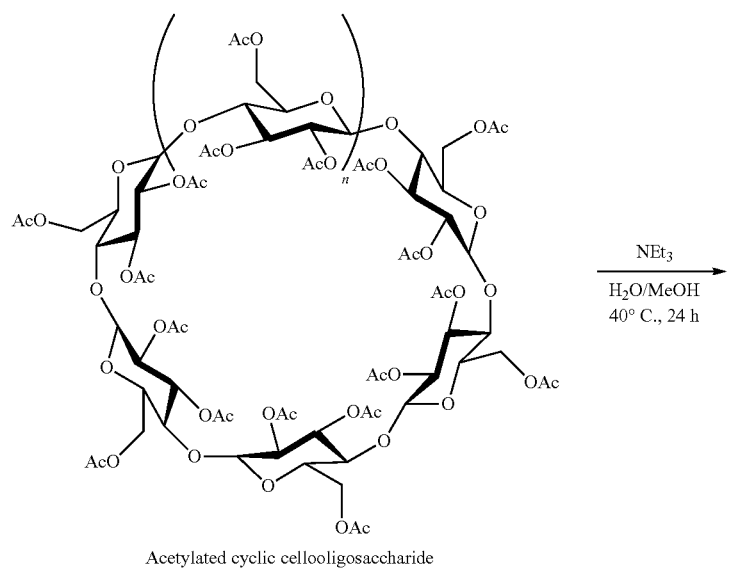

Acetylated cyclic cellooligosaccharide

-continued

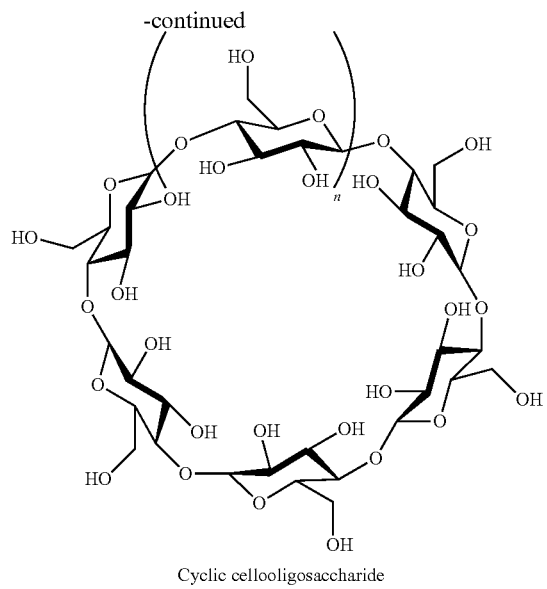

Cyclic cellooligosaccharide

The acetylated cyclic cellooligosaccharide (4.0 mg) was dissolved in methanol (1.2 mL), and water (0.8 mL) was added thereto. Further, triethylamine (0.8 mL, 5.5×10³ mol) was added, and the mixture was stirred at 40° C. for 24 hours. The solvent was distilled off to give a crude product (4 mg). The reaction formula is as shown above.

Figure 16:
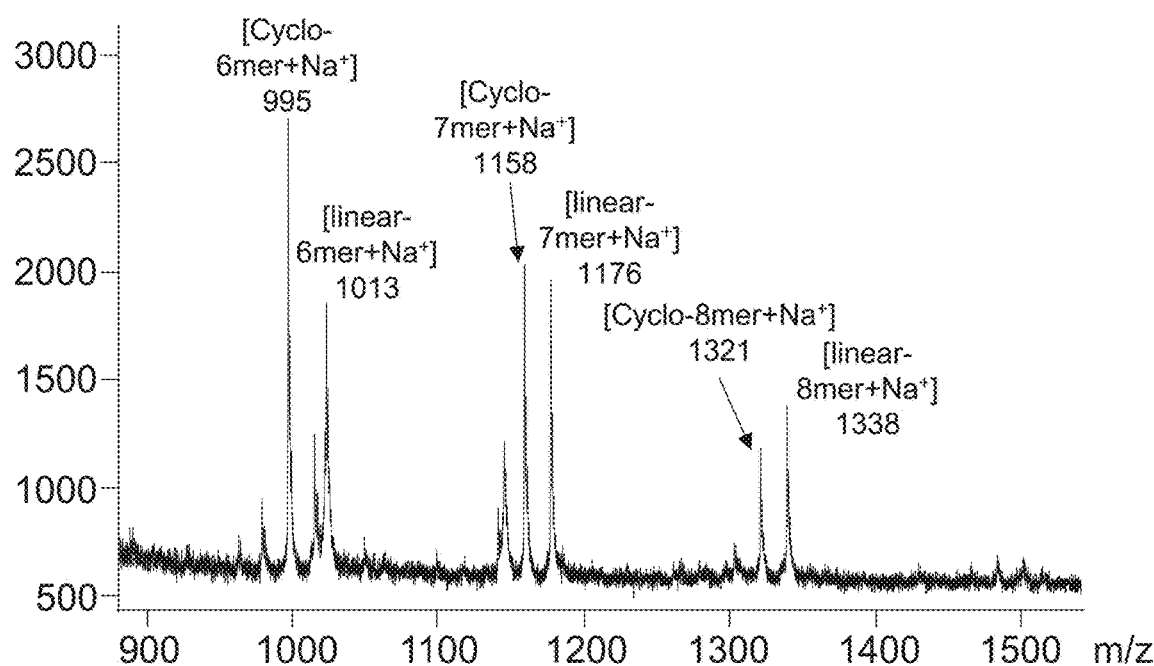
FIG. 16 is an MALDI-TOF MS spectral diagram of a crude product containing a cyclic cellooligosaccharide in Example 2.

MALDI-TOF-MS measurement was performed on the obtained crude product. The results are shown in FIG. 16. As shown in FIG. 16, peaks corresponding to the hexameric to octameric linear cellooligosaccharides and also peaks corresponding to the hexameric to octameric cyclic cellooligosaccharides were observed.

Some embodiments of the present invention have been described above. However, these embodiments are presented as examples and are not intended to limit the scope of the invention. These embodiments can be implemented in various other forms, and various omissions, replacements and modifications can be made without departing from the spirit of the invention. These embodiments and omissions, replacements, modifications and the like of the embodiments fall within the scope or spirit of the invention and also fall within the scope of the invention as defined by the appended claims and equivalents thereof.

The invention claimed is:

1. A cyclic oligosaccharide represented by the following general formula (1):

[Chemical Formula 1]

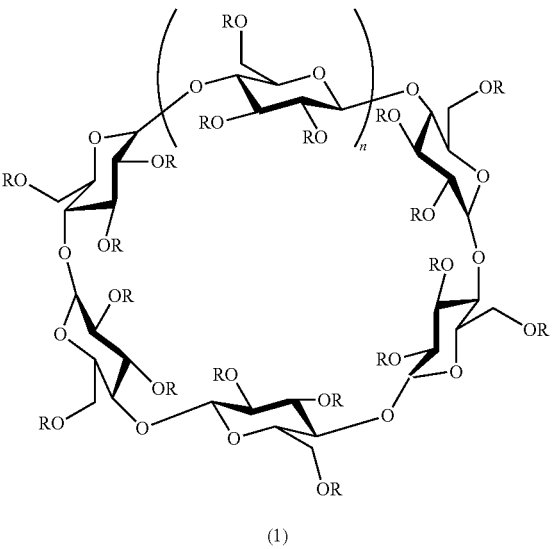

(1)

wherein R represents a hydrogen atom or a substituent thereof, a plurality of the Rs may be identical or different, and n represents an integer of 0 to 3; and wherein the constituent units are linked by β-1,4 glucosidic bonds.

2. A method for producing the cyclic oligosaccharide according to claim 1, comprising binding hydroxy groups at terminals of an oligosaccharide represented by the following general formula (2) for cyclization:

[Chemical Formula 2]

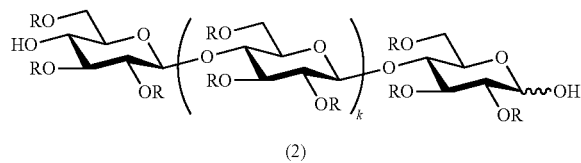

(2)

wherein R represents a hydrogen atom or a substituent thereof, a plurality of the Rs may be identical or different, and k represents an integer of 3 to 6.

\* \* \* \* \*